US010244395B2

(12) United States Patent
Weidenfeller et al.

(10) Patent No.: US 10,244,395 B2
(45) Date of Patent: Mar. 26, 2019

(54) ACCESS CONTROL FOR A WIRELESS NETWORK

(71) Applicant: Telefonaktiebolaget LM Ericsson (publ), Stockholm (SE)

(72) Inventors: Thomas Weidenfeller, Aachen (DE); Ralf Berger, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 231 days.

(21) Appl. No.: 15/110,767

(22) PCT Filed: Jan. 14, 2014

(86) PCT No.: PCT/EP2014/050583

§ 371 (c)(1),
(2) Date: Jul. 11, 2016

(87) PCT Pub. No.: WO2015/106798

PCT Pub. Date: Jul. 23, 2015

(65) Prior Publication Data

US 2016/0337858 A1    Nov. 17, 2016

(51) Int. Cl.
*H04W 12/08* (2009.01)
*H04L 29/06* (2006.01)
(Continued)

(52) U.S. Cl.
CPC ........... *H04W 12/08* (2013.01); *H04L 63/107* (2013.01); *H04W 4/80* (2018.02); *H04W 12/06* (2013.01);
(Continued)

(58) Field of Classification Search
CPC ....... H04W 12/08; H04W 4/80; H04W 12/06; H04W 12/04; H04W 88/10; H04W 88/06; H04L 63/107; H04L 63/18

See application file for complete search history.

(56) References Cited

U.S. PATENT DOCUMENTS

2002/0023213 A1    2/2002  Walker et al.
2002/0174335 A1*  11/2002  Zhang ................. H04L 63/0227
                                                        713/168
(Continued)

FOREIGN PATENT DOCUMENTS

WO    2010115604 A2    10/2010
WO    2013080035 A2     6/2013

OTHER PUBLICATIONS

Haverinen, E. et al., "Extensible Authentication Protocol Method for Global System for Mobile Communications (GSM) Subscriber Identity Modules (EAP-SIM)", Network Working Group Request for Comments: 4186, Jan. 1, 2006, pp. 1-93, The Internet Society.

(Continued)

*Primary Examiner* — Brandon S Hoffman
*Assistant Examiner* — William A Corum, Jr.
(74) *Attorney, Agent, or Firm* — Coats & Bennett, PLLC

(57) ABSTRACT

The invention relates to techniques for restricting a wireless network access for a mobile device (200). There is provided an additional cross-checking functionality on a comparator (106) of an intermediate node (100). The mobile device (200) receives a user key (88) indicating a general validation to access the WLAN of a third party. The third party operates a key server (300). The key server (300) issues a key pair, consisting of the user key (88) and an operator key (99). The operator key (99) is sent to the intermediate node (100) and is processed by a processor (105). The mobile device (200) applies the received user key (88) to an identification set (200*i*), identifying the device's user, and sends a reference message (22) to the intermediate node (100) via a second communication channel (2). Thereinafter, the device (200) sends its identification set (200*i*) via another first communication channel (1) for authentication and for cross checking to the intermediate node (100). The intermediate node (100) in turn applies the received operator key (99) to the (Continued)

received message (22) and compares a validation result (33) thereof with the identification set (200i), received via the first communication channel (1). The WLAN network access for the device is only granted in case of identity.

7 Claims, 6 Drawing Sheets

(51) Int. Cl.
    *H04W 12/06* (2009.01)
    *H04W 4/80* (2018.01)
    *H04W 88/06* (2009.01)
    *H04W 88/10* (2009.01)
    *H04W 12/04* (2009.01)
(52) U.S. Cl.
    CPC ............ *H04L 63/18* (2013.01); *H04W 12/04* (2013.01); *H04W 88/06* (2013.01); *H04W 88/10* (2013.01)

(56) References Cited

U.S. PATENT DOCUMENTS

2005/0245235 A1   11/2005  Vesuna
2010/0031029 A1*   2/2010  Ilyadis ................. H04L 9/3271
                                                                713/156

OTHER PUBLICATIONS

Arkko, J., "Extensible Authentication Protocol Method for 3rd Generation Authentication and Key Agreement (EAP-AKA)", Network Working Group Request for Comments: 4187, Jan. 1, 2006, pp. 1-80, The Internet Society.

Arkko, J. et al., Improved Extensible Authentication Protocol Method for 3rd Generation Authentication and Key Agreement (EAP-AKA'), Network Working Group Request for Comments: 5448, May 1, 2009, pp. 1-30, IETF.

* cited by examiner

ACCESS CONTROL FOR A WIRELESS NETWORK

TECHNICAL FIELD

The present disclosure relates to techniques for controlling access to a wireless network. In particular, a technique is disclosed for restricting access to a WLAN network.

The present solution may be practiced for mobile devices communicating via a wireless communication channel and having a short range communication interface as well. In particular the solution may be used in scenarios in which a mobile device's user participates in a third party's infrastructure. Further, the present solution is applicable to an authenticator of an access point (AP).

BACKGROUND

The Extensible Authentication Protocol (EAP) is a framework for authentication, with many authentication standards derived from it. The EAP protocol is disclosed in "Extensible Authentication Protocol (EAP)", RFC 3748 (available as free download via the Internet).

Some of the derived standards refer, for example, to:

EAP-SIM as disclosed in "Extensible Authentication Protocol Method for Global System for Mobile Communications (GSM) Subscriber Identity Modules (EAP-SIM)", RFC 4186.

EAP-AKA as disclosed in "Extensible Authentication Protocol Method for 3rd Generation Authentication and Key Agreement (EAP-AKA), RFC 4187.

EAP-AKA' as disclosed in "Improved Extensible Authentication Protocol Method for 3rd Generation Authentication and Key Agreement (EAP-AKA'), RFC 5448.

These standards use credentials on mobile phone's SIM or USIM card to identify, authenticate and obtain authorization on a WLAN. That is, information originally intended for mobile broadband access is used to gain access to another kind of network (WLAN). Other EAP standards use similar key/credential material from other sources.

EAP-based authentication mechanisms often use a backend AAA server to authenticate a user. For example, a WLAN access point (AP) supporting EAP-SIM, EAP-AKA or EAP-AKA' uses a mobile network operator's AAA server to authenticate WLAN users. Every user provisioned in that AAA server will be granted access to an AP which authenticates against that particular AAA server.

There are many EAP-based authentication mechanisms. Several of them use some a form of credential/identity/key information to authenticate against a WLAN access point, where the actual authentication happens by using some form of AAA server in a backend, and the AP acts as an intermediate instance, running the necessary protocols and protocol conversions.

EAP-SIM/AKA/AKA' are some of those authentication protocols, using SIM or USIM credentials. They are of particular interest to mobile operators, because they allow using mobile network authentication infrastructure for WLAN authentication. This, in turn, allows a mobile operator to offer WLAN access ("hotspots") to his mobile subscribers without the need for the mobile subscribers to configure WLAN passwords etc. Since the authentication is based on SIM or USIM credentials, the network operator then has the ability to use his charging infrastructure to charge the user for provided WLAN services.

However, there are different scenarios in which not every user provisioned in that AAA server should be granted access to an AP. By contrast, it should be possible to provide an infrastructure that only a specific user who has obtained a special access right via a third party should be granted access.

Restricting access to WLAN when there is an authentication protocol that authenticates against some backend AAA server would require changing authorizations in that backend server. If that backend server is, however, controlled by a different entity than the entity granting the special access it would require the later to have access to mission-critical infrastructure of the former. That is not desirable.

Several sets of short-range wireless communication technologies exist. Examples of short range communication are Bluetooth and near field communication (NFC). NFC and Bluetooth are both short-range communication technologies that may be integrated into mobile devices (like e.g. smartphones). NFC is supported by different operating systems, like e.g. Android systems. NFC typically requires a distance of 4 cm or less to initiate a connection. NFC allows to share small payloads of data between an NFC tag and an end device, or between two end devices. Tags can range in complexity. Simple tags offer just read and write semantics, sometimes with one-time-programmable areas to make the card read-only (write-once, read-many WORM). More complex tags offer more operations, and have cryptographic hardware to authenticate access to a sector. The most sophisticated tags contain operating environments, allowing complex interactions with code executing on the tag. The data stored in the tag can also be written in a variety of formats. For example for Android systems, many of the Android framework APIs are based around a NFC Forum standard called NDEF (NFC Data Exchange Format).

SUMMARY

There is a demand for a technique for restricting access to a wireless communication network. There is a demand for an infrastructure, based on which it is possible to grant users or customers a special access right to the WLAN in case they are specifically or specially authorized for access. In particular, there is a demand for restricting access from a user's mobile device to an AP in the case the user has rented a car with a build-in WLAN hotspot or is customer of a coffee bar with a WLAN hotspot. A third party's server operated by or on behalf of the rental car company or the owner of a coffee bar should control access to the WLAN. Restricting the WLAN access needs to happen in a simple way not requiring any effort on the network operator's side for each (car or service) booking case. And the restriction should not require much additional effort from the user who should be granted that special access.

The invention is embodied in independent claims. Advantageous embodiments are described in the dependent claims.

The demand is satisfied with an intermediate node for restricting access to a wireless network for a mobile device requesting access to the wireless network, wherein the intermediate node is adapted to interact via a first communication channel, being a wireless communication channel and via a second communication channel, being a short range communication channel for interacting with the mobile device. The intermediate node further comprises a first unit for receiving an identification set of the mobile device via the first communication channel. The first unit may be an in-car WLAN AP. The intermediate node further comprises a second unit which is adapted for receiving a second, different reference message via the second communication channel and the intermediate node comprises a third interface to a key server, wherein the intermediate node is adapted to receive an operator key from the key server. Moreover, the intermediate node comprises a processor which is adapted to apply the received operator key to the received reference message in order to generate a validation result. Finally, the intermediate node comprises a comparator which is adapted to compare the validation result with the received identification set and in case of identity: the first unit which acts as WLAN access point is adapted to proceed with an authentication procedure for accessing the wireless network, using the identification set.

Moreover, the demand is satisfied with a method for operating an intermediate node for restricting access to a wireless network for a mobile device, requesting access to the wireless network, wherein the intermediate node exchanges data with the mobile device via a first communication channel, being a wireless network and another second communication channel and interfaces with a key server. The method comprises several steps. In a first step an operator key is received from the key server. In a further step a reference message is received from the mobile device via the second communication channel. In a further step the received operator key is applied on the received reference message to generate a validation result. In a further step an identification set is received from the mobile device via the first communication channel. In another step the validation result is compared with the received identification set. In case of identity the intermediate node proceeds with an authentication procedure using the identification set for wireless network access for the requesting mobile device.

Further, the demand is satisfied with a mobile device for accessing a wireless network with a first communication channel for providing an identification set of the mobile device's user and with a second communication channel for mobile communication. The mobile device comprises an internal storage for storing the identification set of the mobile device's user. The mobile device further comprises a message generator, which is adapted for receiving a user key from a key server and which generates a reference message, based on applying the received user key to the identification set and which is adapted for sending the reference message to an intermediate node via the second communication channel.

Further, the demand is satisfied with a method for operating a mobile device for accessing a wireless network with a first communication channel, being a wireless communication channel for providing an identification set of the mobile device's user and with a second communication channel for short range communication. The method comprises several steps. In a first step a user key is received from a key server. In a further step an identification set of the mobile device's user is received. In another step a reference message is generated by applying the received user key to the identification set. In another step the reference message is sent to an intermediate node via the second communication channel. In a further step the identification set is sent via the first communication channel to the intermediate node.

Moreover, the demand is satisfied with an access system for restricting access to a wireless network for a mobile device, requesting access to the wireless network. The access system comprises a mobile device, requesting access to the wireless network. The mobile device is configured as mentioned above. Further, the access system comprises an intermediate node. The intermediate node is configured as mentioned above. Moreover, the access system comprises a key server. The key server comprises a key-pair generation module for generating a key pair, comprising a user key and a bijectively associated operator key, and for sending the user key to the mobile device and for sending the operator key to the intermediate node.

Further, the device nodes are adapted to perform all steps as claimed in connection with the corresponding method which is to be performed in the corresponding node.

BRIEF DESCRIPTION OF THE DRAWINGS

In the following, the invention will further be described with reference to exemplary embodiments illustrated in the figures, in which.

DETAILED DESCRIPTION

Figure 1:
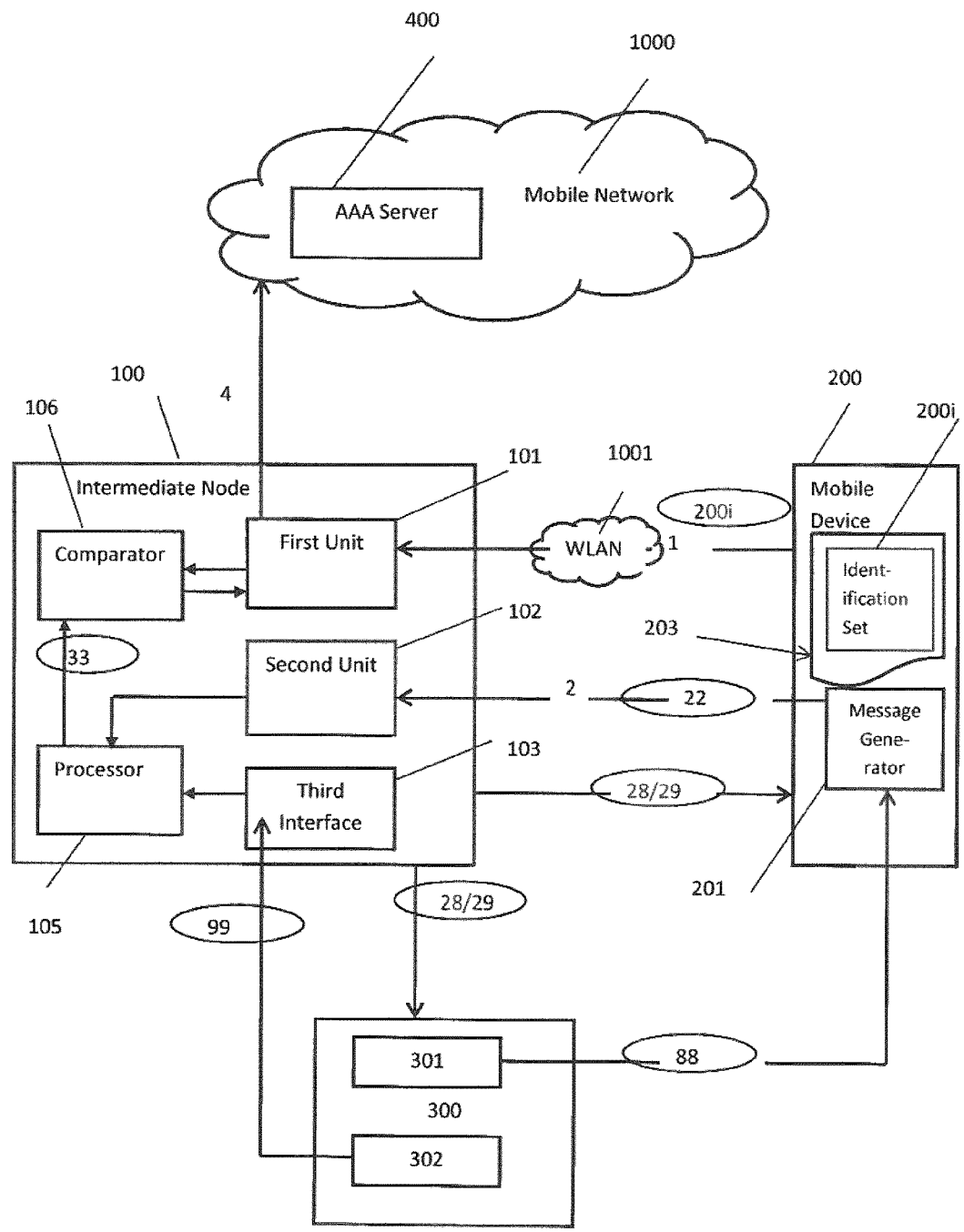
FIG. 1 schematically shows an infrastructure of an intermediate node in a context of other entities according to an embodiment, FIG. 2 a flow chart of a method in an intermediate node according to an embodiment FIG. 3 a flow chart of a method in a mobile device according to an embodiment FIG. 4 schematically shows an embodiment of an intermediate node

In the following description, for purposes of explanation and not limitation, specific details are set forth, such as particular network environments and communication standards etc., in order to provide a thorough understanding of the current invention. It will be apparent to one skilled in the art that the current invention may be practiced in other embodiments that depart from these specific details. For example, the skilled artisan will appreciate that the current invention may be practiced with any short range communication network, like for example near field communication (NFC) or Bluetooth. As another example, the invention may also be implemented in any mobile device, having the respective interfaces, like a smartphone, a mobile phone, a mobile computer system, or a personal digital assistant.

For summarizing, it is proposed to provide a technique for restricting wireless network access for a mobile device, based on an authentication pre-obtained from a key server, which is provided and operated by a third party. The key server is different from a network operator or a network operator's server. In particular, an authenticator function of an access point (AP) is provided with an additional functionality and is therefore also called an extended authenticator. The additional functionality refers to cross checking a mobile device user's identity in the form of an identification set with a validation result which serves as reference identification set and which is based on a reference message. The identification set and the reference message are provided via different communication channels. The identification set may be transmitted and processed according to the standard EAP-SIM, EAP-AKA, EAP-AKA' and/or any other suitable authentication procedures. The proposed solution is based on a transmission of an identification set, e.g. the IMSI of the mobile device via a first communication channel, and the secure transmission of the reference message via a separate additional (or second) communication channel, e.g. NFC, in the form of a reference message, comprising a processed form of the identification set, using a user key which is generated by the key server.

The approval or disapproval of WLAN network access for the mobile device is based on requirements to be fulfilled by the device, which are defined by a third party server. In particular, the approval or disapproval of the wireless network access is based on a key pair, comprising a user key and an operator key.

In the following a definition of terms used within this application is given.

The intermediate node may be a relay instance, a router or switch for data exchange for special authentication of the user's phone to the WLAN based on the authentication of the third party server and an AAA server. According to a first embodiment the intermediate node is a car on-board-unit (OBU). According to a second embodiment the intermediate node is an intermediary hardware unit for wireless network access, installed in a coffee bar or in a store. The intermediate node may comprise a first and second unit, a third interface, a processor and a comparator as different software and/or hardware modules. According to an embodiment, the modules mentioned before may be combined to one single or at least two separate modules. Preferably, however, the processor and the comparator are to be implemented as separate instances. Alternatively, the comparator and the first unit may be combined to a common unit.

Generally, the separation or combination of these modules has to be construed as being functional. It is possible to combine different functions in one module and/or to split a specific function on more than one module. Thus, the intermediate node may be implemented as hardware node but may also be implemented as virtual node, consisting of different hardware units. When units or parts are deployed separately from the intermediate node, the remaining intermediate node may still be called an on-board-unit.

The first unit may be an interface for receiving an identification set and in particular a wireless interface.

The second unit may be an interface, in particular a short range interface, like inter alia NFC or Bluetooth. The second unit is adapted for receiving a reference message from the mobile device. The second unit may be integrated in a processor and/or in other modules of the intermediate node, mentioned above.

The processor may be deployed as a separate unit in the intermediate node. The processor may be thought of as a verifier, which is adapted to verify whether or not the processor was capable to encrypt the reference message. If yes, the processor generates a validation result, indicating that the third-party generated user key, issued to the respective user, matches the third-party generated operator key, and thus confirming that the user key is valid, according to an embodiment that the user indeed has a valid online ticket.

The comparator may be deployed as a unit and may be interpreted in the sense of an extended authenticator. It may be provided as separate unit in the intermediate node or may be part of the first unit. Both, the processor as well as the comparator may or may not be part of the intermediate node. According to an embodiment all units of the intermediate node are located in the car.

The processor, the comparator and/or the other units of the intermediate node may be implemented as an embedded system. An embedded system is a combination of hardware and software modules, including a microprocessor or other digital computing circuit which is limited in computing power and/or memory size because it is embedded (i.e., built in to) another product. An embedded system is expected to function without human intervention. An example of an embedded system is a microcomputer and software stored in a read-only memory (ROM) that starts running the stored program when it is turned on and does not stop until it is turned off.

The mobile network may be a mobile broadband network, 3G, 4G or another network technology. The mobile network may provide a connection through an access point to the wider Internet, but only after the user was granted access to the WLAN. This gives users the ability to move around within a local coverage area and still be connected to the Internet. The WLAN may be based on IEEE 802.11 standards.

The mobile device may be a smartphone, mobile phone or another mobile computing device with at least two separate interfaces, in particular comprising a wireless interface and a short range interface. While requesting the special access right to the wireless network, the smartphone should be located at the second unit in order to be able to exchange data via the short range interface. The solution presented in this application refers to a plurality of mobile devices. Thus, it is possible to provide special wireless network access for a plurality of mobile devices in parallel. For the sake of clarity, in the claims, only one of the plurality of mobile devices is explicitly mentioned.

The message generator is a module, which may be implemented in software and/or in hardware. It provides an additional functionality to the mobile device for getting special network access.

The first communication channel is a wireless communication channel, which may be used for transmission of data according to one of the EAP protocols or any other suitable protocol. According to an embodiment, the first communication channel is a signaling channel of the WLAN to which access is thought.

The second communication channel is a short range communication channel, which may be a NFC or Bluetooth connection. The second communication channel is connecting the mobile device with the intermediate node or with modules thereof. According to an embodiment, the second communication channel may only be used in one direction (from device to intermediate node). According to another embodiment, the latter channel is used for bidirectional data exchange.

The identification set comprises the user's IMSI and/or other credentials or identifiers, like the MSISDN, from the user's SIM card, USIM card, or any other kind of identity-confirming or identity-providing unit in the smartphone. The identification set is uniquely associated to the mobile device or to the user of the same. The identification set is stored in an internal storage of the device. The internal storage might be combined with or provided by the user's SIM card, USIM card, or any other kind of identity-confirming or identity-providing unit, or it might be separate internal storage in the device.

The reference message is associated to the identification set and may relate to a processed form of the identification set. Both, the identification set and a reference message are digital datasets and serve for cross checking the user's access right to the wireless network.

The third party could be any service functionality, providing a service to a user. The third party is responsible for defining special access rights to the wireless network. A key server is operated by or on behalf of a third party. The third party may be for example a car rental infrastructure or a coffee bar owner. It is to be understood that other embodiments refer to any other infrastructure scenario, like for example a provider of public transport or a store provider, who want to grant their clients special network access in case they fulfil requirements. The requirements may be defined by the third party.

The key server might be any server or server infrastructure. It may consist of front-end and back-end system. The key server and the intermediate node communicate for example according to an http protocol, via messages, comprising emails, sms and others. They may communicate over the same mobile network as the intermediate node and the AAA Server do. Alternatively, the connection network between the key server and the intermediate node may be a separate or different network. The third party with its key server cooperates with the network operator, but operates the key server independent of the network operator's AAA server. The key server and the mobile device interact via a wireless network, or any other kind of suitable communication system as mentioned above, too. The user key might, for example, be obtained in case of a set of data transmitted via a communication network, or a key code the user needs to manually enter into the mobile device.

The operator key and the user key are generated by the key server or a module provided or operated by the third party, like a car rental company. According to a first embodiment the keys are a cryptographic key pair. The key pair may be generated in accordance with a symmetric or asymmetric key generation algorithm. According to a further embodiment, the key pair may refer to a digital voucher code and a uniquely associated reference voucher code. Thus, the user key may be an online ticket for booking a service (e.g. car rental, public transport ticket) of the service provider, operating the key server.

FIG. 1 depicts an architecture of the provided infrastructure according to an embodiment of the present invention.

A mobile device 200 which has at least two different interfaces, a first communication channel 1 for WLAN communication and a second communication channel 2 for short range communication, like NFC. The mobile device 200 interacts with an intermediate node 100, which in a first embodiment may be deployed as OBU in a car of a car rental fleet. For a wireless network authentication different procedures may be used, like EAP-based authentication, e.g. EAP-SIM/AKA/AKA' authentication protocols, using SIM or USIM credentials, which are stored as identification set 200i on the mobile device 200. The identification set 200i is used to authenticate against a WLAN access point, which may be implemented as first unit 101, where the authentication procedure is executed by using an AAA server 400 in a backend node. The intermediate node 100, thus, acts as intermediate instance, running the protocols and conversions. The identification set 200i is sent over the first communication channel 1 using a suitable EAP message. In FIG. 1 the mobile network is represented with reference numeral 1000. The WLAN network (also called wireless network) to which access shall be granted is numbered 1001. An interface 4 to a mobile network serves for communication between the intermediate node 100 or its first unit 101 and the AAA-Server 400 in the mobile network 1000.

A key server 300 is operated by or on behalf of a third party. The third party is responsible for defining special access rights to the wireless network 1001.

As mentioned above, according to the first embodiment the third party may be a car rental company. The cars to be rented are provided with the On-Board Unit (OBU). The OBU may be deployed as intermediate node 100 with its units. A processor 105 comprises or interacts with a second unit 102, which may be deployed as NFC interface. The processor 105 may be adapted to interact with a third interface 103 for receiving an operator key 99. In an embodiment the operator key 99 may be an operator key (also called: car key). The processor 105 interfaces with a comparator 106. The comparator 106, in turn, interfaces with the first unit 101. The customer of the rental car company interacts with his mobile phone 200. In case the customer has rented a car and uses the same, he may be granted a special WLAN access right.

According to a second embodiment the third party may be a coffee bar or a store with a WLAN access point (AP). The WLAN AP may be deployed as part of intermediate node 100. The coffee bar or store provides the intermediate node 100 or operates the node on behalf of the mobile network operator, located in the bar, shop or store. The customer is granted a special WLAN access right in case he purchases goods in the bar or fulfils other access requirements (e.g. by requiring services, converting bonus points or a voucher etc.). The user/customer can make use of this special WLAN access rights once or when he is initially located in the vicinity of the car or shop etc., in particular in a short range communication distance suitable for NFC communication.

In case the user desires WLAN network access from his mobile phone 200, he waits to receive a user key 88 while purchasing goods or renting a car, or fulfilling other requirements. The user key 88 is issued by the key server 300 as a part of a key pair, consisting of user key 88 and operator key 99. The other part of the key pair, the operator key 99, is sent to the third interface 103, which may be part of an intermediate node 100.

On the mobile device 200 a message generator 201 is provided. The message generator 201 is adapted for receiving the user key 88 from the key server 300, in particular from an online booking system front-end 301 of the key server 300.

A backend management system 302 of the key server 300 is adapted to send the operator key 99 as part of the generated key pair to the third interface 103 or in general to the intermediate node 100.

When the user later on actually requires the WLAN network access from his mobile phone 200, he is to be located in the rented car or at the shop. The message generator 201 on the mobile device 200 is further adapted to generate a reference message 22, based on applying the previously received user key 88 to the identification set 200i and which is adapted for sending the reference message 22 to the intermediate node 100, in particular to the second unit 102 of the intermediate node 100 (shown in FIG. 1) via the second communication channel 2 (e.g. NFC channel).

The received reference message 22 is provided via the second unit 102 to the processor 105. Further, the processor 105 is provided with the received operator key 99 from or via the third interface 103. After being provided with these two datasets, the processor 105 is adapted to apply the received operator key 99 to the received reference message 22 in order to generate a validation result 33. The validation result 33 serves as reference identification set for cross checking. It is provided to the comparator 106. As part of the mobile device 200's sought to gain a WLAN access it transmits the identification set 200i via the first communication channel.

The first communication channel 1 is typically part of the WLAN 1001 for which access is sought.

In the intermediate node 100 the identification set 200i is received via the first communication channel 1 and the wireless network 1001. Previously, the reference message 22 was received via a different wireless second communication channel 2 (e.g. NFC) and the operator key 99 was also previously received via the third interface 103, and the validation result 33 was generated and provided to the comparator.

The comparator 106 is adapted to compare the validation result 33 with the received identification set 200i, which has been received and decoded by the first unit 101 and which also has been provided to the comparator 106. In case of identity (of received identification set 200i and received validation result 33) the comparator 106 adapts the WLAN access point to proceed with an authentication procedure for accessing the wireless network 1001 using the identification set 200i. In FIG. 1, this is represented with the arrow starting at the comparator 106 and heading to the first unit 101. This authentication procedure for WLAN 1001, involving the AAA server 400 in the mobile network 1000 via uplink the interface 4, is executed according to one of the applicable EAP standards or any other applicable protocol.

In case the identification set 200i and validation result 33 do not match or there is another failure, the authentication procedure is not performed and access to WLAN 1001 is not granted.

Figure 4:
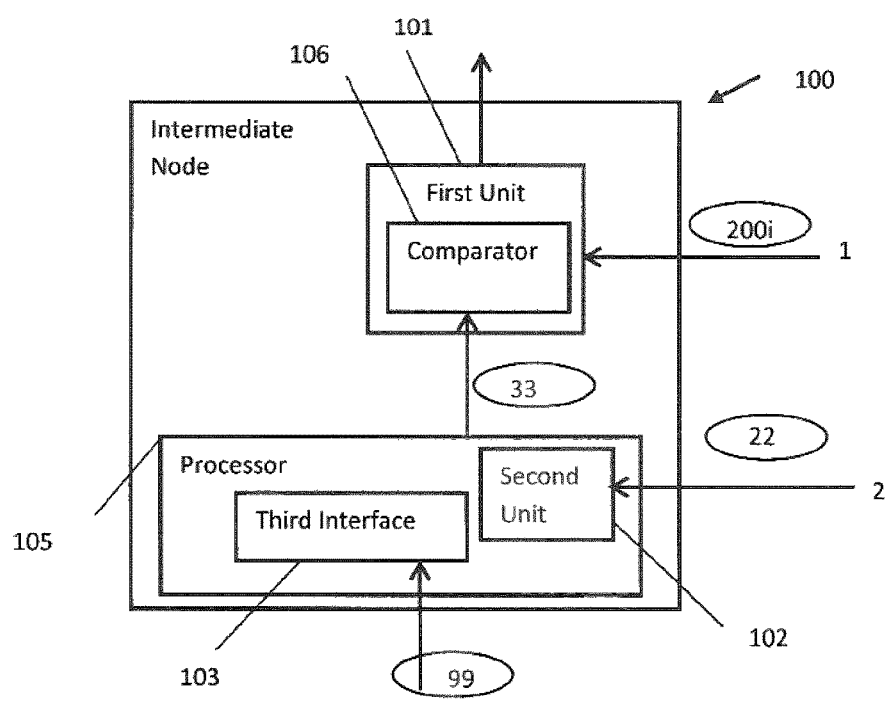

As depicted in the embodiment shown in FIG. 4, the first unit 101 may comprise the comparator 106. The second unit 102 may be part of the processor 105 and may be deployed as NFC interface, which is adapted to receive the reference message 22 via the second communication channel 2 (short range). The third interface 103 may be part of the processor 105, too. The processor 105 and the first unit 101 interact via an appropriate interface, including software and communication interfaces. The processor 105 is adapted to apply the received operator key 99 to the received reference message 22 in order to generate a validation result 33. The comparator 106 is adapted to execute an additional cross checking. In particular, the comparator 106 is adapted to compare the validation result 33, received from the processor 105 with the received identification set 200i. In case of identity: the comparator 106 is adapted to trigger the first unit 101 to proceed with an authentication procedure for accessing the wireless network 1001, using the identification set 200i, the validation result 33, or a combination of both or any other information suitable for establishing an identity.

Figure 2:
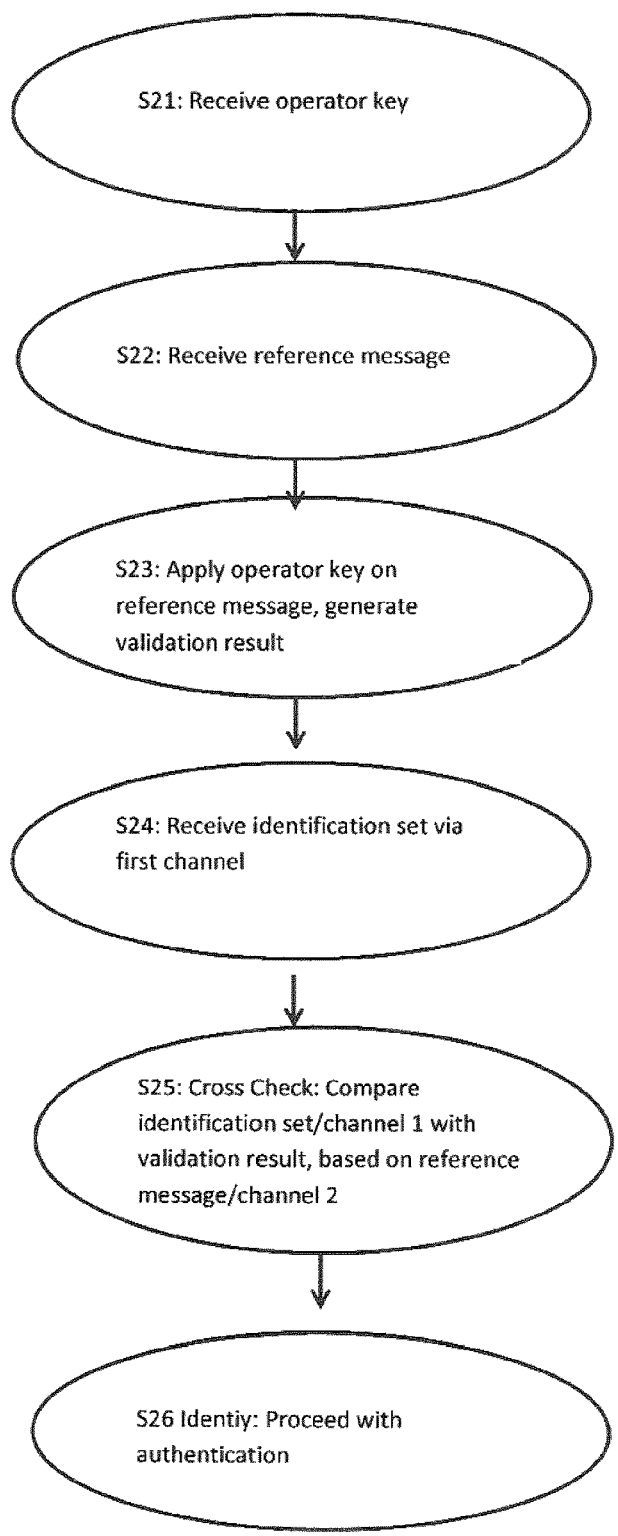

In the following an embodiment of the present invention is presented with respect to FIG. 2, showing a flow chart with steps to be performed at the intermediate node 100.

In step S21 the operator key 99 is received from the key server 300.

In step S22 the reference message 22 is received form the mobile device 200 via the second communication channel 2.

In step S23 the received operator key 99 is applied to the received reference message 22 in order to generate a validation result 33. The validation result 33 serves as reference identification set for cross check.

In step S24 the identification set 200i is received from the mobile device 200 via the first communication channel 1.

In step S25 the validation result 33 is compared with the received identification set 200i.

Only in case of identity the wireless access is granted and in step S26 a (standard) authentication procedure is executed using the identification set 200i for the requesting mobile device 200. Otherwise (in case of mismatch) the access is denied.

However, it has to be noted, that the sequence of method steps may be changed. Thus, in other embodiments it is also possible to execute step S21 after step S22.

According to an embodiment signals may be provided to the mobile device 200 and/or to the key server 300. The signals represent special network access or denial status. In case the special access has been evaluated to be grantable in steps S25, S26 a GRANT signal 28 may be transferred to the device 200 via first communication channel 1 and/or second communication channel 2 (see FIG. 1). Further, the GRANT signal 28 may be transferred to the key server 300 and/or to other units. Further, it is also possible to provide a GRANT and/or DENIED signal 28, 29 on a user interface of the mobile device 200 in order to inform the user of the status of the exclusive wireless network authentication procedure.

Moreover, in case of denial of the network access a DENIED signal 29 may be transferred to the device 200 via first communication channel 1 and/or the second communication channel 2 (see FIG. 1). Further, the DENIED signal 29 may be transferred to the key server 300 and/or to other units.

Figure 3:
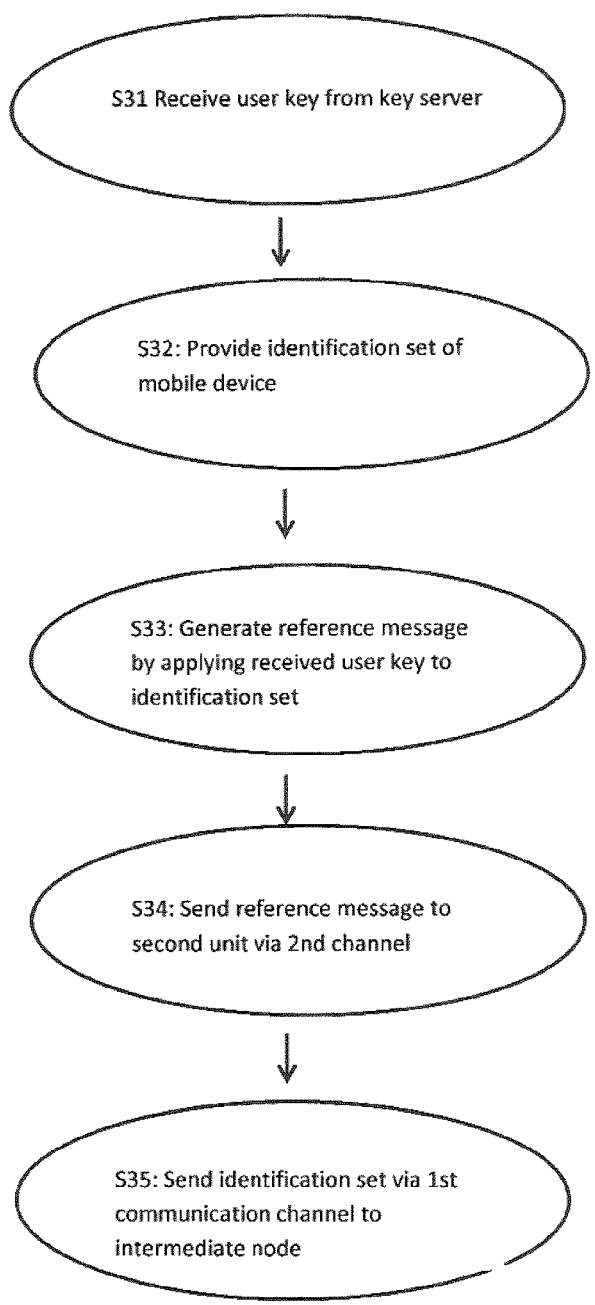

In the following an embodiment of the present invention is presented with respect to FIG. 3, showing a flow chart with steps to be performed at the mobile device 200.

In step S31 the user key 88 is received form the key server 300, preferably, via a wireless interface, including messages sent via email, sms, fax and/or other communication protocols.

In step S32 the identification set 200i of the mobile device 200 is provided, in particular to the message generator 201.

In step S33 the reference message 22 is generated by applying the received user key 88 to the identification set 200i.

In step S34 the reference message 22 is sent to the intermediate node 100 or to the second unit 102 via the second communication channel 2 (e.g. NFC).

In step S35 the identification set 200i is sent via the first communication channel 1 to the intermediate node 100, in particular to first unit 101.

Usually, step S35 is executed after step S34, because for the first unit 101, deployed as WLAN AP, it is only possible to wait for a short time period (because of timeouts in the respective (EAP) protocols) for receiving the signals. However, it has to be noted, that the sequence of method steps may be changed. Thus, in other embodiments it is also possible to execute step S34 after step S35. Further, it is possible to execute step S35 earlier, for example at the beginning of the method steps to be executed on the mobile device 200.

As mentioned above, the first embodiment relates to providing a special network access to a wireless network provided in a car (to be rented). The car rental network access and the system's operation is explained with respect to FIG. 5 as follows.

Figure 5:
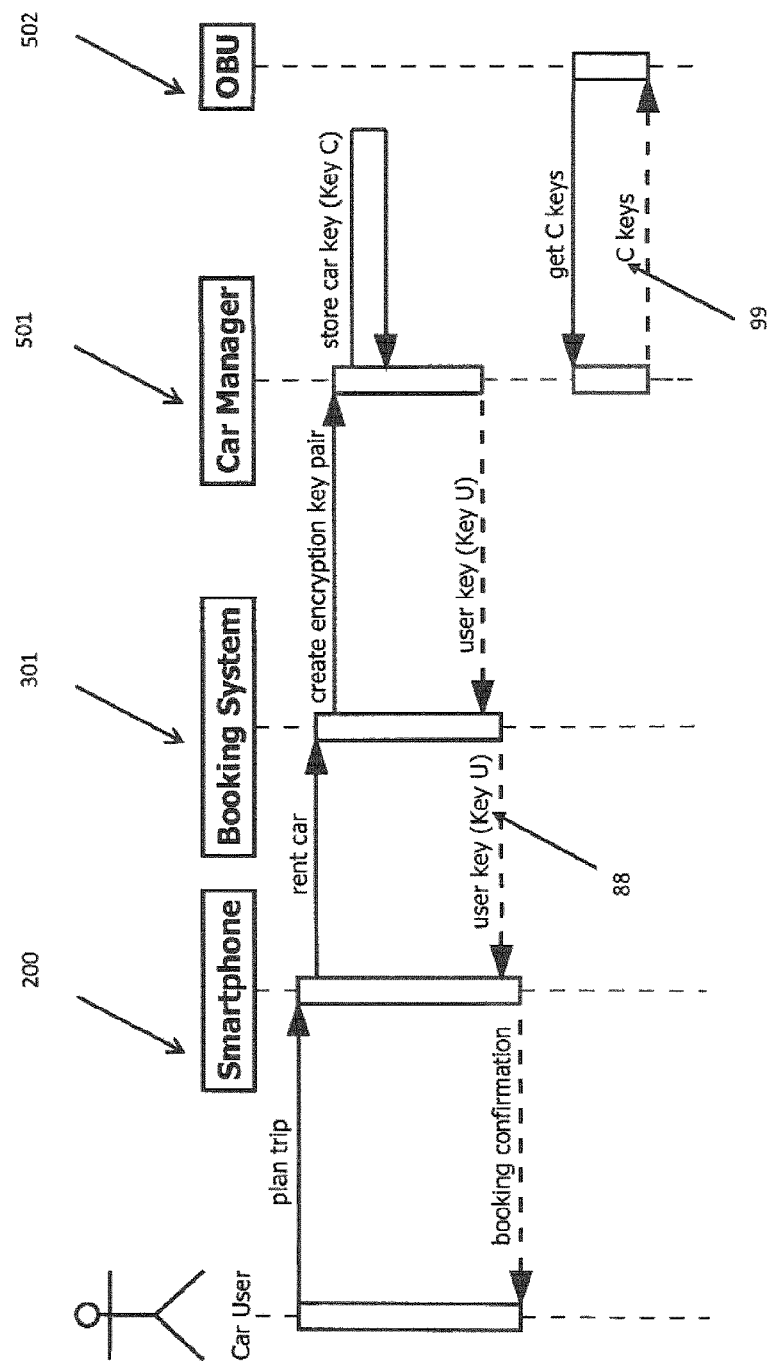
FIG. 5 shows a sequence diagram and functional interrelations between respective nodes according to an embodiment and FIG. 6 shows another sequence diagram and functional interrelations between respective nodes according to an embodiment.

FIG. 5 relates to one possible sequence of actions, steps and/or events in the car rental scenario. However, also other sequences or embodiments are possible, too. A "Car user" in FIG. 5 represents someone who wants to rent a car or to book another service. The smartphone 200 is the car user's smartphone, used to book/rent the car online. The Booking System 301 is an online booking system front-end for renting cars, provided by the car rental company, or provided on behalf of the car rental company. A Car Manager 501 is a backend management system for managing the rental car fleet, provided by the car rental company, or operated on behalf of the car rental company. The Car Manager 501 may be deployed as management system back-end 302.

An OBU 502 is provided as an on-board unit in a car. The OBU 502 may be deployed as intermediate node 100.

When a user rents a car online or via any communication channel (telephone, fax etc.) he or she may receive an "online ticket". The online ticket may be a key code or may be the user key 88 as one half of a cryptographic key pair 88, 99.

The other key of the pair, the operator key 99 (which in FIG. 5 is named "car key" or "Key C"), is sent by the rental car Car Manager 501 on request (FIG. 5) or when appropriate to the third interface 103 of the in-car's OBU, which may be deployed as intermediate node 100, containing the previously described units, of the car the user is supposed to get.

In the following an embodiment of the invention is provided.

Later on, when the user enters the car he briefly "touches" the car at a designated spot with his smartphone 200. This is actually a NFC communication, namely the second communication channel 2, where the smartphone acts as a kind of RFID tag.

The data sent by the smartphone 200 to the car is set up as follows:

The smartphone 200 reads the user's identification set 200*i*, e.g. IMSI or other credentials/identifiers like the MSISDN, from the user's SIM card in the smartphone 200.

The smartphone 200 encrypts the user's credentials/identification set 200*i*, using the user key 88, which it has previously received from the rental car company's online booking system front-end 301.

The smartphone 200 sends the encrypted information as reference message 22 to the car via second communication channel 2.

The data is processed by the car as follows:

The car uses the operator key 99 to decrypt the data received via second communication channel 2, in particular the reference message 22. This may be executed by the processor 105.

Successful decryption indicates that the user indeed has a valid online ticket.

The decrypted information, the verification result 33, for example the IMSI or MSISDN, is now forwarded to the comparator 106.

The in-car WLAN access point now acts as follows:

The comparator 106, after having received a verification result 33, initiates (or reconfigures) the WLAN access point, which may be deployed as first unit 101, to start or continue to offer a WLAN 1001.

Depending on the uplink mobile-network 1000 infrastructure the WLAN 1001's authentication procedure is set up to use a standardized EAP-type authentication like EAP-SIM/AKA/AKA', or another authentication mechanism as decided by the network operator.

The user's smartphone 200 can now attempt to connect to WLAN 1001 by attempting the standardized authentication. No changes in the user phone's WLAN stack are required.

When the first unit 101 with the help of the comparator 106 performs the initial step of the WLAN authentication—establishing the identity of the WLAN user—the following procedure is executed, which deviates, e.g. from the normal EAP-SIM/AKA/AKA' identity establishment:

Instead of just using the identification set 200*i* as received as part of EAP-SIM/AKA/AKA' identity establishment, the first unit 101 refers the data to the comparator 106 for cross-checking it with the validation result 33, which was generated by the processor 105, based on the reference message 22 received via the second communication channel 2.

Only if the identification set 200*i* and the reference message 22, which serves as reference identification set, are the same, the comparator 106 and the first unit 101 continue with the normal identity establishment, involving the operator's infrastructure and from there on to the authentication.

If the identification set 200*i* and the reference message 22 do not match, the comparator 106 adapts the first unit 101 to ignore or reject that particular WLAN client 200—it can't be the client/user who should get exclusive access to the WLAN. In this case the DENIED signal 29 may be sent to the mobile phone 200 and/or to the key server 300 as notification that the access has been denied.

Figure 6:
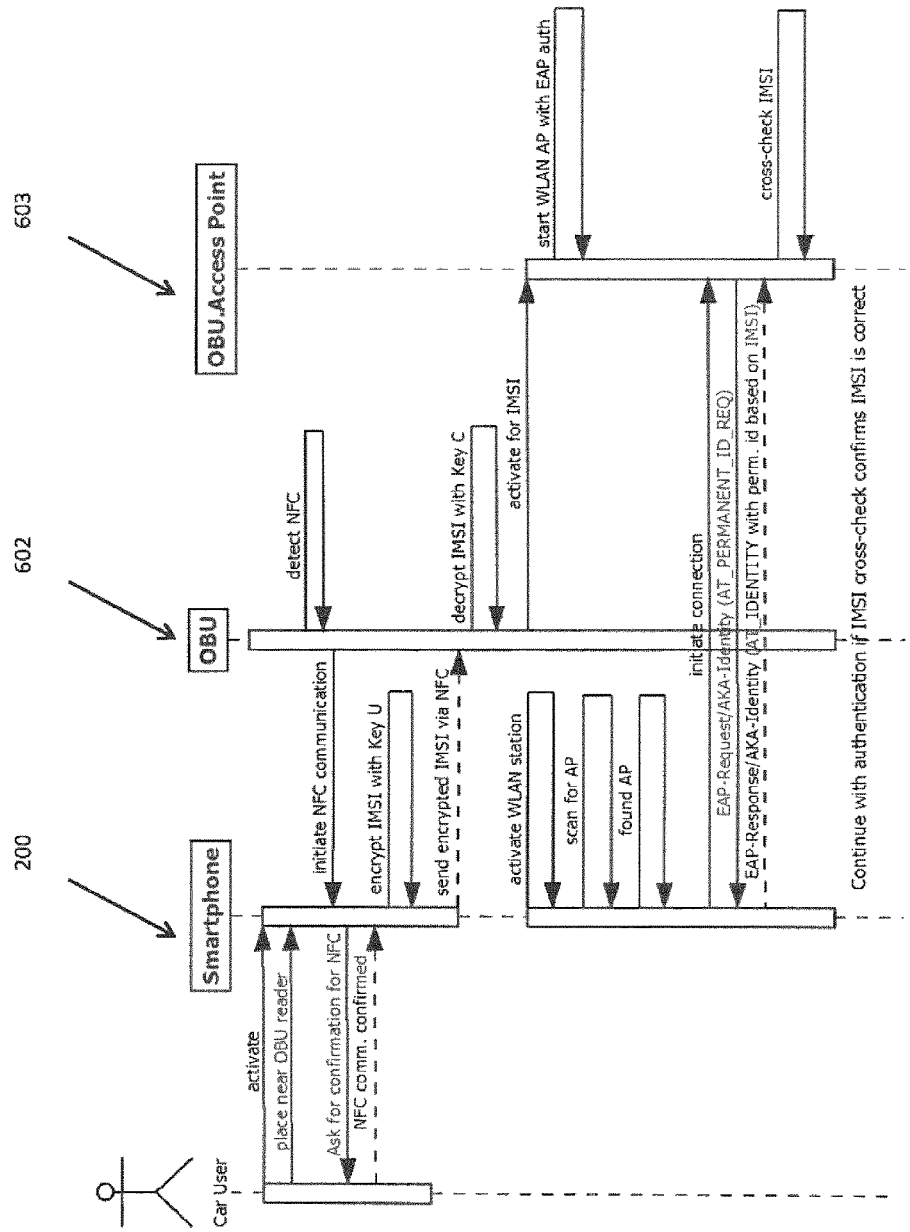

In the following an embodiment of the present invention is presented with respect to FIG. 6 showing a sequence diagram of operations and data exchange of respective units. FIG. 6 provides an example of how the car user gains access to WLAN 1001 using an in-car access point in a rented car. In this example the IMSI is used to provide the identification set 200*i* using EAP-AKA identity establishment as part of EAP-AKA authentication.

At the key server 300 the following steps are executed. First the user key 88 and the corresponding operator key 99 are generated. Then the user key 88 is sent to the mobile device 200 via any kind of communication channel, for example a mobile network connection. Then, the operator key 99 is sent to the third interface 103. The sequence of the last to steps may be changed. The sending of the operator key might happen on request of the third interface 103 or the intermediate node 100 or at any appropriate time.

According to an embodiment additional communication may be executed between the mobile device 200 and the key server 300. For example, a request is sent from the device 200 to the key server 300 in order to indicate that the user wants to get WLAN access. Further, a validation tag may be sent from the key server 300 to the mobile device 200. The validation tag indicates third party specific requirements and/or other evaluations (whether or not the user pays his mobile bill etc.), issued by the key server 300.

According to a further embodiment, the GRANT signal 28 is provided at the device 200 and/or at the server key 300 in case the access to the wireless network has been granted.

According to a further embodiment, the DENIED signal 29 is provided at the device 200 and/or at the key server 300 in case the access has been denied by the intermediate node 100 or the comparator 106 of the same.

According to an embodiment the term "applying" the received user key 88 to the identification set 200*i* in order to generate the reference message 22 is executed by encrypting the identification set 200*i* with the user key 88. This has the advantage that the security relevant identification data, like IMSI, are not transferred in plain text via NFC, but only in a secure and protected (i.e. encrypted) manner.

According to another embodiment the term "applying" is to be construed as "combining". The identification set 200*i* is combined or concatenated with the received user key 88. The user key 88 may be an online ticket with meta information (time stamp etc.). The operator key 99 is associated to the user key 88. According to a further aspect of the invention the operator key 99 is identical to the user key 88. The operator key 99 and user key 88 need not necessarily be a key pair. As mentioned above, the operator key 99 may relate to digital voucher code (i.e. identical to operator key).

The invention has several advantages. Providing the intermediate node and the first unit according to the solution presented herein, enables a company or a WLAN Hotspot owner to restrict WLAN network access for his clients according to its own requirements and configurations. Thus, a mechanism for providing a special network access is provided with a comparator 106 for cross checking functionality. The user of the mobile device 200 may obtain a special right to use that AP from a third party (i.e. car rental, coffee bar), which is different form the network operator.

The solution provides a possibility for securely transmitting a processed form of the user's identification data (e.g. IMSI or MSISDN) in form of a reference message 22 to the car's access point or to the second unit 102, which serves as interface, in advance, via a side channel, in particular via the second communication channel 2.

The invention provides mechanisms for protecting and encrypting the identification set 200i with an "online ticket", which may be implemented as user key 88.

There is provided an efficient mechanism to verify that the user owns a valid special wireless network access and/or online ticket. This verification is indicated by a successful decryption of the identification set 200i received via second communication channel 2.

The solution executes an additional cross check. Namely, using that validation result 33 as reference identification set to cross-check the identification set 200i received as part of WLAN identity establishment so that only the user holding a valid online ticket can access the WLAN.

The network operator does not need to have any specific configuration in his core network to support these special access points.

The third party (the car rental company) can sell online tickets independent of the network operator. I.e. the car rental company online ticket infrastructure and the network operator's infrastructure are not connected and need not exchange any data for any car booking.

The user's identification set need not be given to the third party (the rental company). It remains in the user's smartphone 200 and is only safely (encrypted) transferred to the second unit 102 of the intermediate node 100. This invention does not reduce security. Providing the comparator 106 of the intermediate node 100 with the unencrypted identification set received via NFC in advance does not reduce security. The first unit 101 sees the same clear-text identification set at least once also via normal identity establishment (via first communication channel 1). This is why it is actually possible to compare the identity information.

The network operator is not forced to reconfigure its AAA server 400 every time such special access is granted by the third party (providing the service, like car rental, coffee bar, public transport tickets etc.). The WLAN infrastructure and AP, with its principle mechanism to authenticate against an AAA server 400 and possibly perform charging processing, as set up by a network operator may be used and reused.

With respect to security and confidentiality aspects, the rental car company shall not have access to the network operator's authentication infrastructure. I.e. the rental car company cannot change rights in the operator's AAA server 400. By contrast, this would be needed if only EAP-SIM/AKA/AKA' is used. And which would have to happen for each car-rental case. Thus, this is a major advantage of the present invention.

While the instant invention has been described in relation to its preferred embodiments, it is to be understood that this description is for illustrative purposes only. Accordingly, it is intended that the invention be limited only by the scope of the claims appended hereto.

| | Reference numerals |
|---|---|
| 1 | first communication channel |
| 2 | second communication channel, NFC channel |
| 4 | interface to a mobile network |
| 88 | user key |
| 99 | operator key or car key |
| 400 | AAA Server |
| 1000 | mobile network |
| 1001 | wireless network, WLAN |
| 22 | reference message |
| 200 | mobile device |
| 200i | identification set, in particular IMSI |
| 203 | internal storage of mobile device for storing an identification set |
| 201 | message generator for generating reference message |
| 33 | validation result |
| 100 | intermediate node |
| 101 | first unit, in particular in car WLAN AP |
| 102 | second unit |
| 103 | third interface |
| 105 | processor |
| 106 | comparator |
| 300 | key server (of third party) |
| 301 | Online Booking system front-end |
| 302 | Management system back-end |
| 501 | Car Manager |
| 502 | On Board Unit (OBU) |
| 602 | On Board Unit (OBU) |
| 603 | OBU Access Point |

The invention claimed is:

1. An intermediate node for restricting access to a wireless network for a mobile device requesting access to the wireless network, wherein the intermediate node is adapted to interact via a first communication channel, being a wireless communication channel and a second communication channel, being a short range communication channel, for interacting with the mobile device, wherein the intermediate node comprises:
   a first circuit configured to receive an identification set of the mobile device via the first communication channel;
   a second circuit configured to receive a reference message via the second communication channel;
   a third interface to a key server, wherein the intermediate node is adapted to receive an operator key from the key server;
   a processing circuit which is adapted to apply the received operator key to the received reference message in order to generate a validation result; and
   a comparator which is adapted to compare the validation result with the received identification set and, in case of identity, the first circuit is adapted to proceed with an authentication procedure for accessing the wireless network, using the identification set.

2. The intermediate node according to claim 1, wherein the comparator is at least one of the first circuit and a separate module.

3. The intermediate node according to claim 1, wherein at least one of the third interface and the second circuit is part of the processing circuit.

4. A method for operating an intermediate node for restricting access to a wireless network for a mobile device requesting access to the wireless network, wherein the intermediate node exchanges data with the mobile device via a first communication channel, being a wireless communication channel, and via another second communication channel, being a short range communication channel, and via interfaces with a key server, wherein the method comprises:
   receiving an operator key from the key server;

receiving a reference message from the mobile device via the second communication channel;

applying the received operator key on the received reference message to generate a validation result;

receiving an identification set from the mobile device via the first communication channel;

comparing the validation result with the received identification set and in case of identity proceeding with an authentication procedure using the identification set for wireless network access for the requesting mobile device.

5. The method according to claim 4, further comprising sending at least one signal to at least one of the mobile device and the key server, wherein the signal comprises at least one of a GRANT signal when the validation result and the received identification set include an identify and a DENIED signal when the validation result and the received identification set include a non-identity.

6. The method according to claim 4, wherein the reference message is generated by encrypting the identification set of the mobile device with a user key, wherein the user key and the operator key are generated as key pair, and wherein applying the received operator key comprises decrypting of the received reference message with the operator key.

7. An access system for restricting access to a wireless network for a mobile device requesting access to the wireless network, comprising:
a mobile device for requesting access to the wireless network with a first communication channel being a wireless communication channel for providing an identification set of the mobile device user and with a second communication channel being a short range communication channel for short range communication, wherein the mobile device comprises:
an internal storage for storing the identification set of the mobile device user; and
a message generator which is adapted for receiving a user key from a key server and which generates a reference message based on applying the received user key to the identification set and which is adapted for sending the reference message to an intermediate node via the second communication channel;
an intermediate node adapted to interact with the mobile device, wherein the intermediate node comprises:
a first circuit configured to receive the identification set of the mobile device via the first communication channel;
a second circuit configured to receive the reference message via the second communication channel;
a third interface to the key server, wherein the intermediate node is adapted to receive an operator key from the key server;
a processing circuit which is adapted to apply the received the operator key to the received reference message in order to generate a validation result; and
a comparator which is adapted to compare the validation result with the received identification set and, in case of identity, the first circuit is adapted to proceed with an authentication procedure for accessing the wireless network using the identification set;
the key server that generates a key pair, comprising the user key and a bijectively associated operator key, and for sending the user key to the mobile device and for sending the operator key to the intermediate node.

* * * * *